Patented July 16, 1940

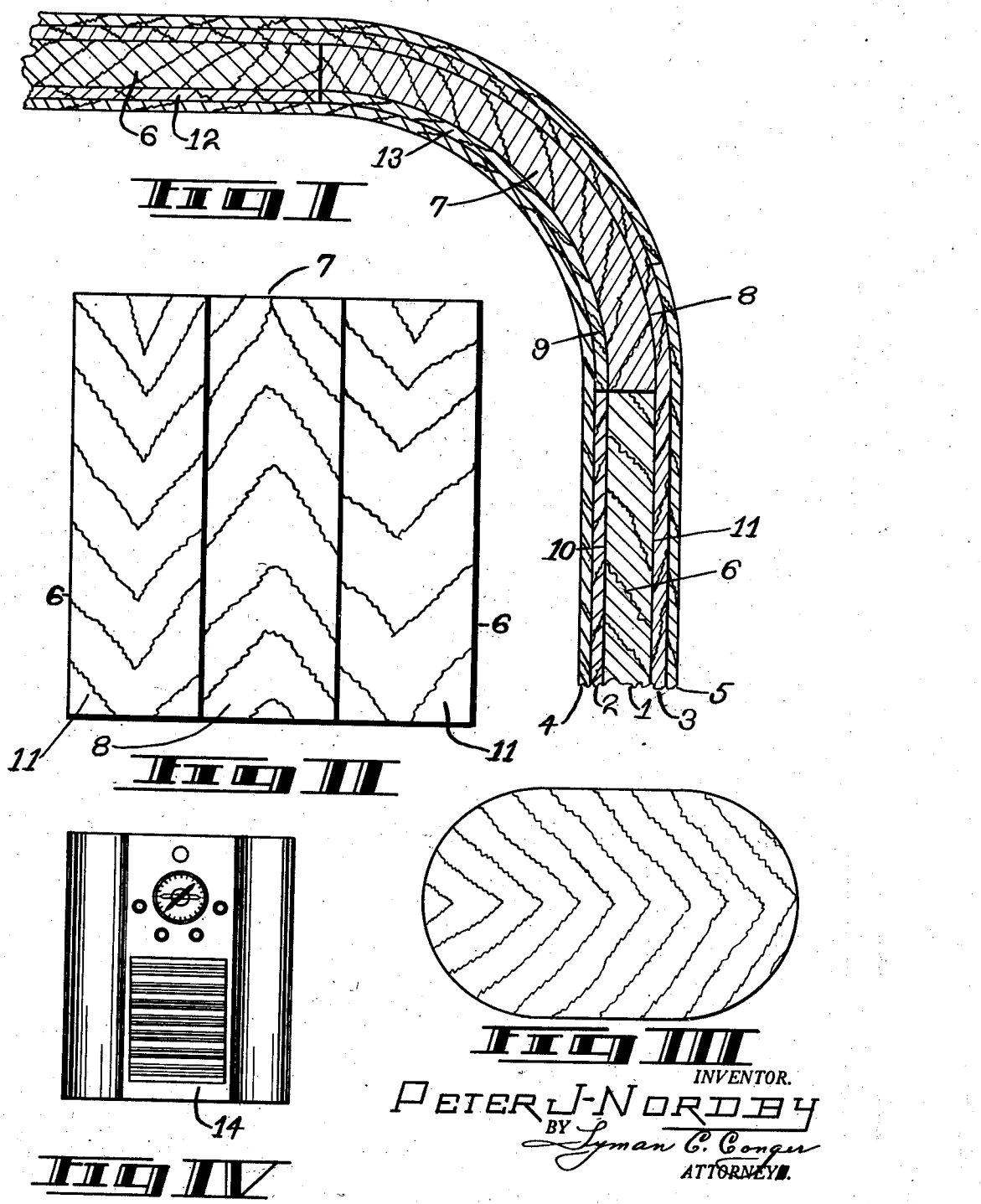

2,207,939

UNITED STATES PATENT OFFICE 2,207,939

VENEERED ARTICLE AND METHOD OF MANUFACTURE THEREOF

Peter J. Nordby, Sheboygan, Wis., assignor to Clarence Anton

Application June 15, 1936, Serial No. 85,191

16 Claims. (Cl. 144—309)

My invention relates to improvements in a veneered article and in the method of manufacture thereof.

It has heretofore been considered necessary, when bending veneered panels, to steam the panel prior to bending and to bend it, after such steaming, by the application of great pressure in suitable forms, cauls or dies, or, in the alternative, to cut away all but the facing strip of the veneer at the point of bend and to bend the facing strip around a suitably formed wooden form or key. Both of these methods are costly, requiring, in the first instance, a large outlay for dies and equipment and, in the second instance, a large expense for cutting the veneer, shaping the keys, etc.

These disadvantages have been so serious that veneer is often not bent but only flat surfaces are formed of veneer and bent surfaces or corners are formed of a suitably shaped, solid wood insert or pilaster or a pilaster having a facing of veneer. This, in turn, is disadvantageous due to cost as well as the fact that the completed article is not unitary in construction.

It is the object of my invention to obviate these difficulties by providing a simple, convenient and economical method of bending veneer which results in a product of superior quality. Other objects and advantages will be apparent from the following description.

In the drawing Figure 1 is a sectional view of a bent veneer panel formed in accordance with my invention; Figure 2, an elevation of the core or center strip prior to assembling; Figure 3, a plan view of a cabinet formed from veneer bent by my improved method and Figure 4, a front view thereof.

Veneer is cut from the log by cutting in a rotary direction around the log so that the veneer is stripped off in annular layers and the annular rings are followed rather than cut across as is the case when slabs and flitches are sawed from the log.

As a consequence of the manner of cutting the veneer, one surface of each individual strip is the surface which, during growth, was innermost or nearest the heart of the tree, while the other surface is the surface which was outermost or nearest the bark of the tree. For convenience in description I have termed this innermost surface the heartwood surface and the outermost surface the sapwood surface. It will be understood, however, that these terms as used in the description and claims do not mean that the innermost surface is actually composed of heartwood and the outermost surface of sapwood since, due to the thinness of the strips, they will almost invariably be composed of wood of the same nature and texture, but only that the heartwood surface is the surface nearest the heartwood and the sapwood surface, the surface nearest the sapwood of the tree.

I have discovered that, while veneer strips of the thickness used for the core of a composite panel resist bending in a manner such that the sapwood surface is the innermost or concave surface and, unless steamed or otherwise treated, tend to fracture rather than bend, such strips may readily be bent in the opposite direction, that is, so that the heartwood surface is the innermost or concave surface.

These surfaces may be identified by marking them in a suitable manner as the veneer strip is cut.

Figure 1 illustrates the manner in which this discovery is utilized commercially. It will be understood that, although the invention is herein illustrated and described with particular reference to five ply veneer, that is veneer composed of five plies or strips, it is not limited to such a construction as the manner of utilizing a greater or lesser number of plies as desired will be obvious.

Five ply veneer is composed of a center strip or core 1, an inner cross band 2 and an outer cross band 3, and an inner face strip 4 and an outer face strip 5.

The core 1 is ordinarily of considerably greater thickness than any of the other plies and the cross bands 2 and 3 are ordinarily positioned so that the grain of the wood runs in a direction transverse to that of the core 1 and the face strips 4 and 5.

The construction thus far described is a conventional one and my improvement consists in arranging the plies to take advantage of the above-mentioned bending qualities of the different surfaces of the plies.

In my improved method the core 1 is formed in sections glued together in a manner well known. The sections 6 extend through the portions which are designed to be flat surfaces in the finished article and the section 7 extends through the portion which is designed to form the curve or bend.

The section 7 is so positioned that its sapwood surface 8 will be outermost or adjacent the convex surface of the curve while its heartwood surface 9 will be adjacent the concave surface of the curve. The sections 6 are positioned in the opposite manner so that the sapwood surface 10 is adjacent the heartwood surface 9 of section 7 while the heartwood surface 11 is adjacent the sapwood surface 8 of the section 7.

Thus is formed a core which may be readily bent at section 7, in the direction indicated, while the sections 6 will resist bending and remain flat or straight even though no form or die is used to hold them during the bending operation.

I prefer to form the inner cross band 2 in similar sections 12 and 13, the section 13 being adjacent the section 7 of the core. The sections 12 are positioned with the grain of the wood running in a direction transverse to that in the core sections 6 while the section 13 is positioned with the grain of the wood running in a direction substantially parallel to the grain of core section 7 the grain of the latter running in a direction parallel to the axis of the imaginary cylinder of which the core portion 7 forms a part and also, like section 7, has its sapwood surface on the convex surface of the curve and its heartwood surface on the concave surface of the curve.

The inner and outer face strips 4 and 5 may be unitary, as shown, or may be composed of different woods or different grains of wood depending upon the decorative effect desired. For example, the curved portion of the face may be formed of what is known as butt veneer which has a more variegated grain than ordinary wood. Such butt veneer, although it is difficult to bend by ordinary methods, may be readily bent by this method.

It will be understood that the veneer is assembled and glued in a flat sheet or plane usually under pressure and subsequently bent to the form desired. The best time for bending the assembly is after the glue is set.

The bending is done cold without the application of steam or heat and, since little pressure is required and the veneer bends naturally into a curve, no press, form or die is required. The bending may be done by manual pressure and other surfaces of the article may be used as the form. For example, in making the cabinet illustrated the veneer panel may be bent around the top and bottom of the cabinet, previously shaped as shown, and the panel nailed or otherwise secured in place as the bending progresses. Of course, if desired, a form may be used or the bending done by a light press. In the latter case the press may be a light construction and may be manually operated since very little pressure is required. Or any other suitable method of bending may be employed, the specific means employed to do the bending forming no part of my invention.

The elimination of presses, dies, etc., renders the process much less expensive, not only in the outlay for equipment, but in time consumed in placing the work, operating the press and in waiting for the veneer to dry before removal from the press.

A further advantage is that the veneer may be sanded while in a flat sheet, hence a sanding machine may be used for this purpose and the hand work necessitated by a curved article is avoided.

Not only sanding but routing, carving, cutting to shape and trimming edges, in fact, practically all operations, except varnishing or painting and decorating may be performed prior to the bending operation.

The face strip 5 may be of a single panel of wood or a panel of a different kind of wood may be inserted therein as shown at 14 in Figure 4 and, if desired, the strip of veneer may then be routed to form a grille of a contrasting color or grain to the balance of the panel.

Figures 3 and 4 illustrate a cabinet formed from a single panel of veneer, bent to the form shown. It will be noted that the bending of the curved surfaces does not result in any distortion of the front of the cabinet but that, due to the positioning of the core in this portion to resist bending as heretofore described, this surface is perfectly flat and straight.

It will be understood that, by proper positioning of the elements, reverse curves or any desired form of curve may be bent.

The construction herein described and illustrated is for the purpose of illustration only and it will be apparent that many modifications thereof may be made without invention, therefore I do not limit myself to the specific construction disclosed but claim all methods and constructions within the scope of the appended claims.

I claim:

1. A composite veneer panel comprising a core and a cross band and bent into a curve at one or more portions to form a portion of a cylinder, the sapwood surfaces of said cross band and said core being on the convex surface of said curve throughout the arc thereof and the grain of said core running in a direction substantially parallel to the longitudinal axis of said cylinder, the grain of said cross band running substantially parallel to the grain of said core throughout the arc of said curve and transverse to the grain of said core throughout the non-curved portions of said article and the sapwood surfaces of said core throughout the non-curved portions of said article being oppositely disposed to the sapwood surfaces thereof at said curve.

2. A composite veneer panel comprising a core and a cross band and bent into a curve at one or more portions to form a portion of a cylinder, the sapwood surfaces of said cross band and said core being on the convex surface of said curve throughout the arc thereof and the grain of said core running in a direction substantially parallel to the longitudinal axis of said cylinder, the grain of said cross band running substantially parallel to the grain of said core throughout the arc of said curve and transverse to the grain of said core throughout the non-curved portions of said article.

3. A composite veneer panel comprising a core and a cross band and bent into a curve at one or more portions to form a portion of a cylinder, the sapwood surfaces of said cross band and said core being on the convex surface of said curve throughout the arc of said curve and the grain of said core and said cross band running in a direction substantially parallel to the longitudinal axis of said cylinder throughout the arc of said curve.

4. A composite veneer article comprising a core and a cross band and bent into a curve at one or more portions, the sapwood surfaces of said cross band and said core being on the convex surface of said curve throughout the arc of said curve.

5. A composite veneer article comprising a core and bent in a direction such that the sapwood surface of said core is on the convex portion of said bend, said core being positioned, at the points not bent, with its sapwood surface oppositely disposed to the sapwood surface thereof at said bend.

6. A composite veneer article comprising a center strip or core and bent in a direction such that the sapwood surface of said core is on the convex portion of said bend.

7. The method of forming veneer comprising forming a composite veneer panel comprising a core and a cross band; positioning said cross band and said core so that the sapwood surface of one is adjacent the heartwood surface of the other and mending said panel in a direction such that the sapwood surfaces of said core and said inner cross band are on the convex portion of said bend.

8. The method of bending veneer comprising forming a composite veneer panel having a core and bending said panel in a direction such that the sapwood surface of said core is on the convex surface of said bend and the heartwood surface of said core is on the concave surface of said bend.

9. The method of forming veneer comprising forming a core of a plurality of sections, positioning one of said core sections with its sapwood surface oppositely disposed to the sapwood surfaces of the other core sections, positioning a cross band with its grain substantially parallel to the grain of said first mentioned core section and its sapwood surface adjacent the heartwood surface of said first mentioned core section at all points adjacent said first mentioned core section, forming a composite veneer panel comprising said core and said cross band and bending said panel at the point of said first mentioned core section in a direction such that the sapwood surfaces of said first mentioned core section and said cross band are on the convex surface of said bend and the grain of said first mentioned core section is parallel to the longitudinal axis of the bend.

10. The method of forming veneer comprising forming a core of a plurality of sections, positioning one of said core sections with its sapwood surface oppositely disposed to the sapwood surfaces of the other core sections, forming a cross band of a plurality of sections, positioning one section of said cross band adjacent said first mentioned core section with its grain substantially parallel to the grain of said core section, positioning the other sections of said cross band adjacent the other sections of said core with their grain transverse to the grain of said other core sections, forming a composite veneer panel comprising said core and said cross band and bending said panel at the point of said first mentioned core section in a direction such that the sapwood surface of said first mentioned core section is on the convex surface of the bend.

11. The method of forming veneer comprising forming a core of a plurality of sections, positioning one section of said core with its sapwood surface oppositely disposed to the sapwood surface of the other core sections, forming a composite veneer panel comprising said core, and bending said panel in a direction such that the sapwood surface of said first mentioned core section is on the convex surface of said bend and the heartwood surface thereof on the concave surface of said bend.

12. The method of forming veneer comprising positioning a cross band adjacent a core to form a panel in such manner that the sapwood surface of said cross band is adjacent the heartwood surface of said core and the grain of said cross band substantially parallel to the grain of said core and bending said panel in a direction such that the sapwood surfaces of said core and said cross band are on the convex surface of said bend.

13. The method of forming veneer comprising forming a core of a plurality of sections, positioning one section of said core with its sapwood surface oppositely disposed to the sapwood surfaces of the other core sections, forming a composite veneer panel comprising said core and bending said panel cold in a direction such that the sapwood surface of said first mentioned core section is on the convex surface of said bend and the heartwood surface thereof on the concave surface of said bend.

14. The method of forming a composite veneer panel comprising a core and a cross band, positioning said cross band and said core so that the sapwood surface of one is adjacent the heartwood surface of the other and bending said panel cold in a direction such that the sapwood surfaces of said core and said cross band are on the convex surface of said bend.

15. The method of forming a composite veneer panel which consists in cutting strips of veneer from a log, marking said strips at the time of cutting to identify the sapwood surface thereof, forming a core from said strips, forming a composite veneer panel comprising said core and bending said panel at ordinary temperature in a direction such that the sapwood surface of said core will be on the convex surface of the curve.

16. The method of forming a composite veneer panel which consists in cutting strips of veneer from a log in a rotary direction, marking said strips at the time of cutting to identify the sapwood surface thereof, forming a core and a cross band from said strips with the sapwood surfaces of said core and said cross band in predetermined relationship to each other, forming a composite veneer panel comprising said core and said cross band and bending said panel at an ordinary temperature in a direction such that the sapwood surfaces of said core and said cross band will be on the convex surface of the curve.

PETER J. NORDBY.